Sept. 12, 1961 S. W. ALDERSON 2,999,317
DRAFTING APPARATUS
Filed July 22, 1957 6 Sheets-Sheet 1

INVENTOR.
SAMUEL W. ALDERSON
BY John P. Chandler
his ATTORNEY

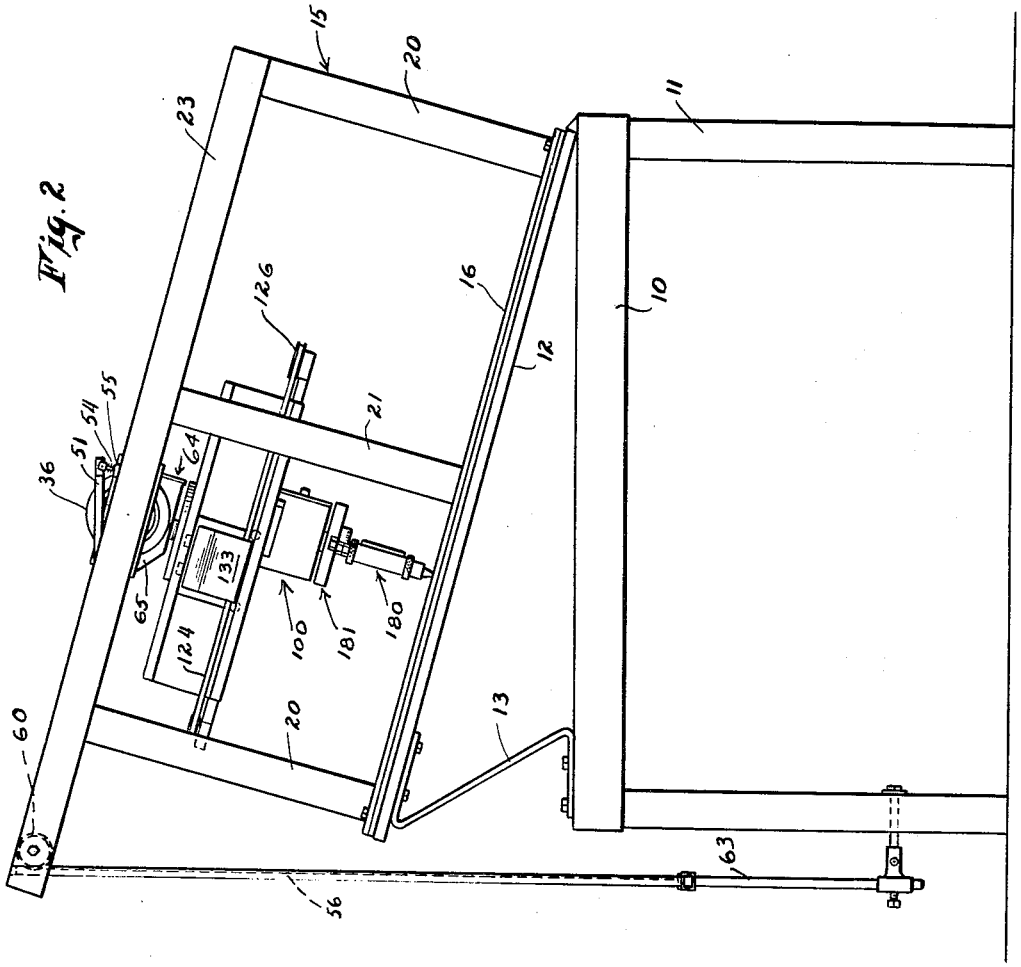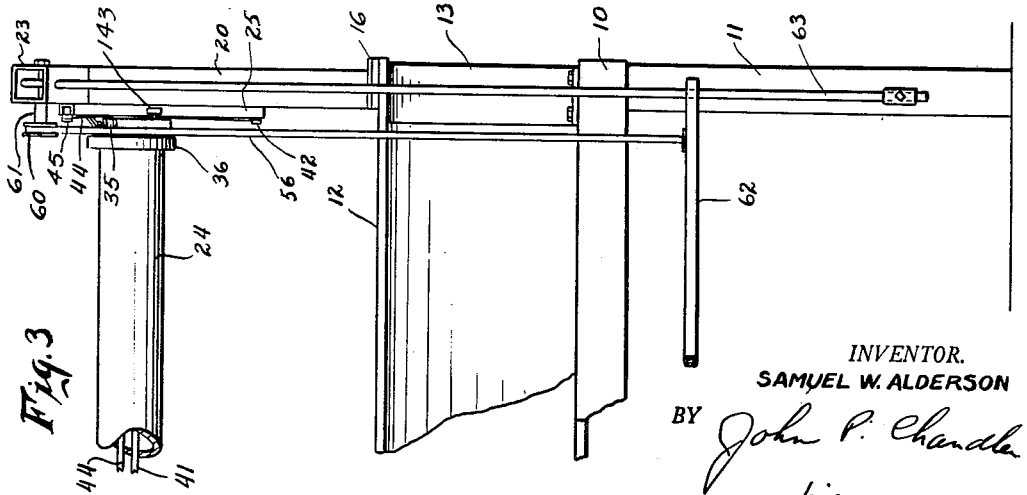

Sept. 12, 1961 S. W. ALDERSON 2,999,317
DRAFTING APPARATUS
Filed July 22, 1957 6 Sheets-Sheet 3
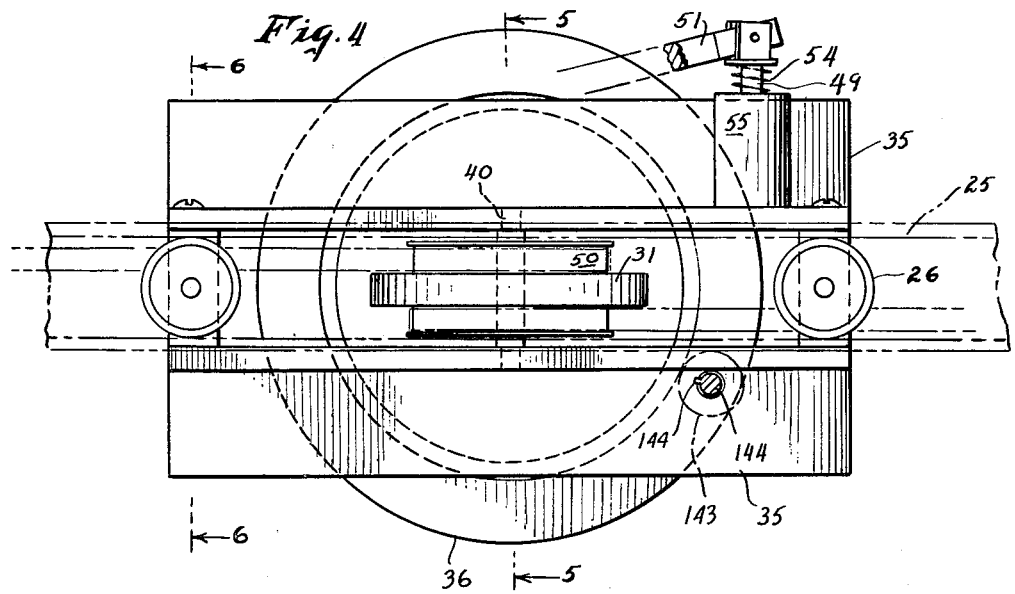
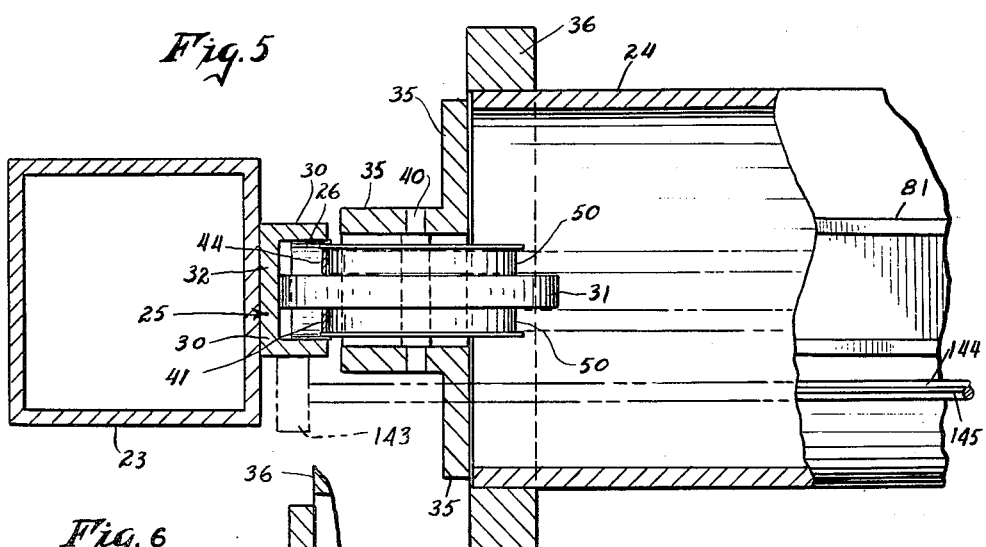
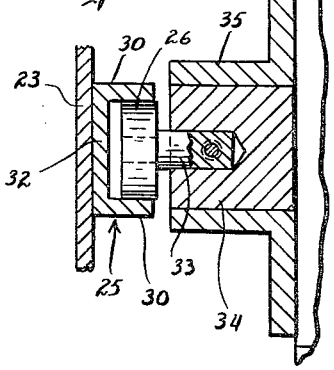
INVENTOR.
SAMUEL W. ALDERSON
BY John P. Chandler
his ATTORNEY Sept. 12, 1961 S. W. ALDERSON 2,999,317
DRAFTING APPARATUS
Filed July 22, 1957 6 Sheets-Sheet 4
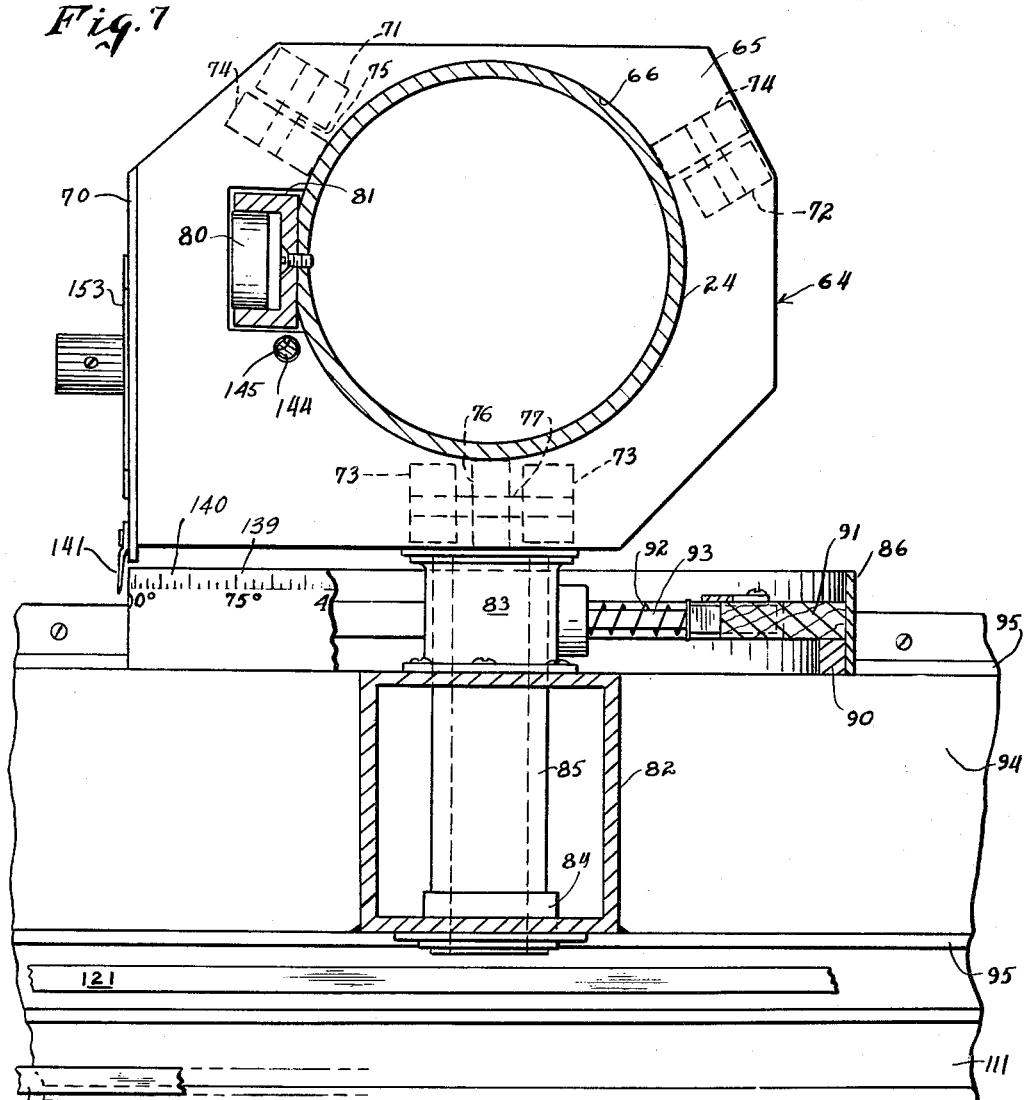
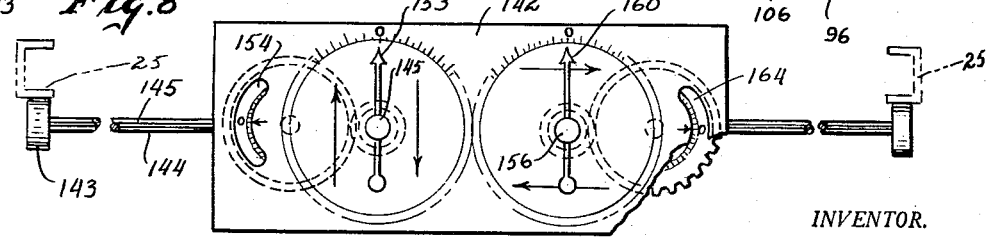
INVENTOR.
SAMUEL W. ALDERSON
BY John P. Chandler
his ATTORNEY Sept. 12, 1961  S. W. ALDERSON  2,999,317
DRAFTING APPARATUS
Filed July 22, 1957  6 Sheets-Sheet 5
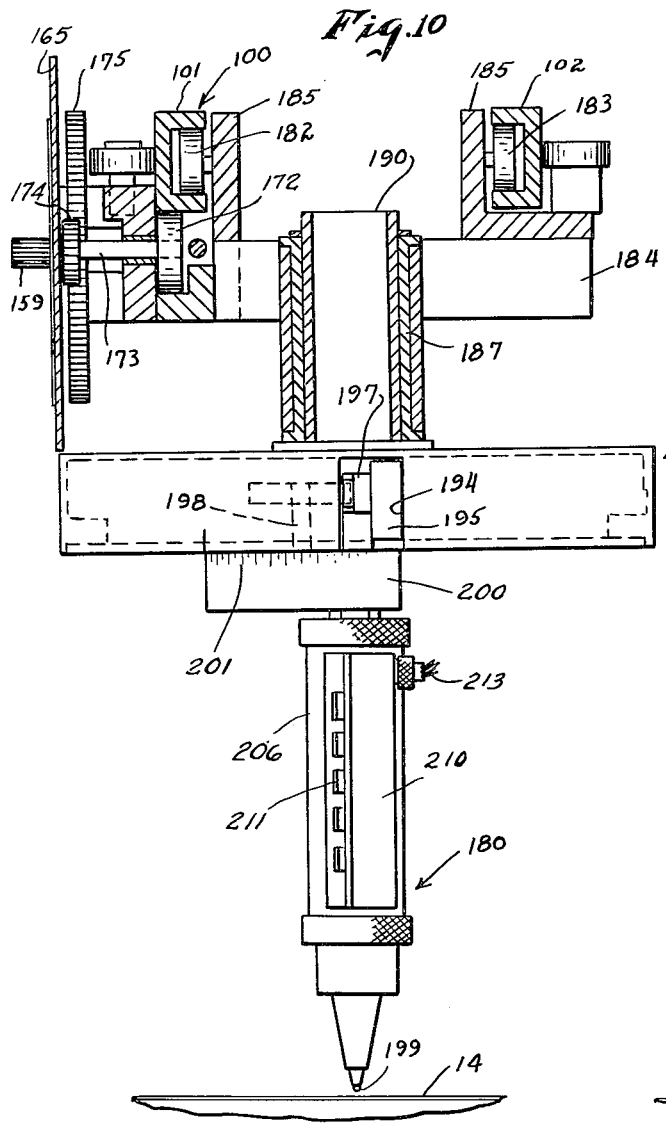
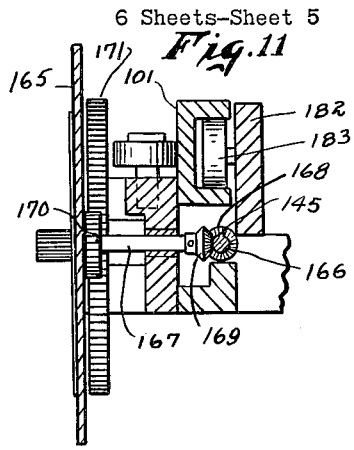
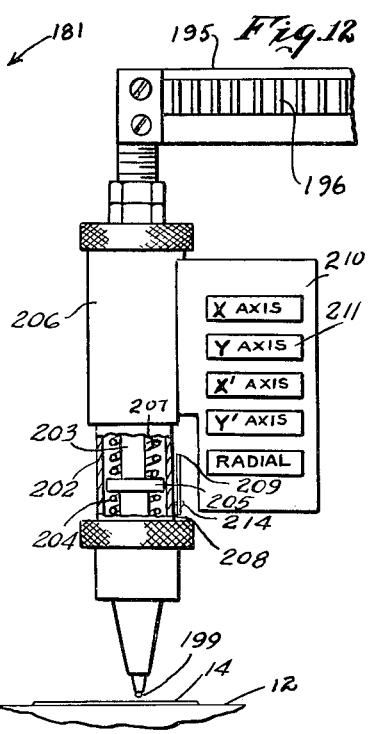
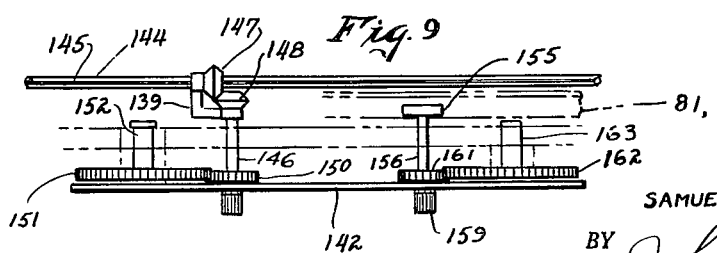
INVENTOR.
SAMUEL W. ALDERSON
BY John P. Chandler
his ATTORNEY

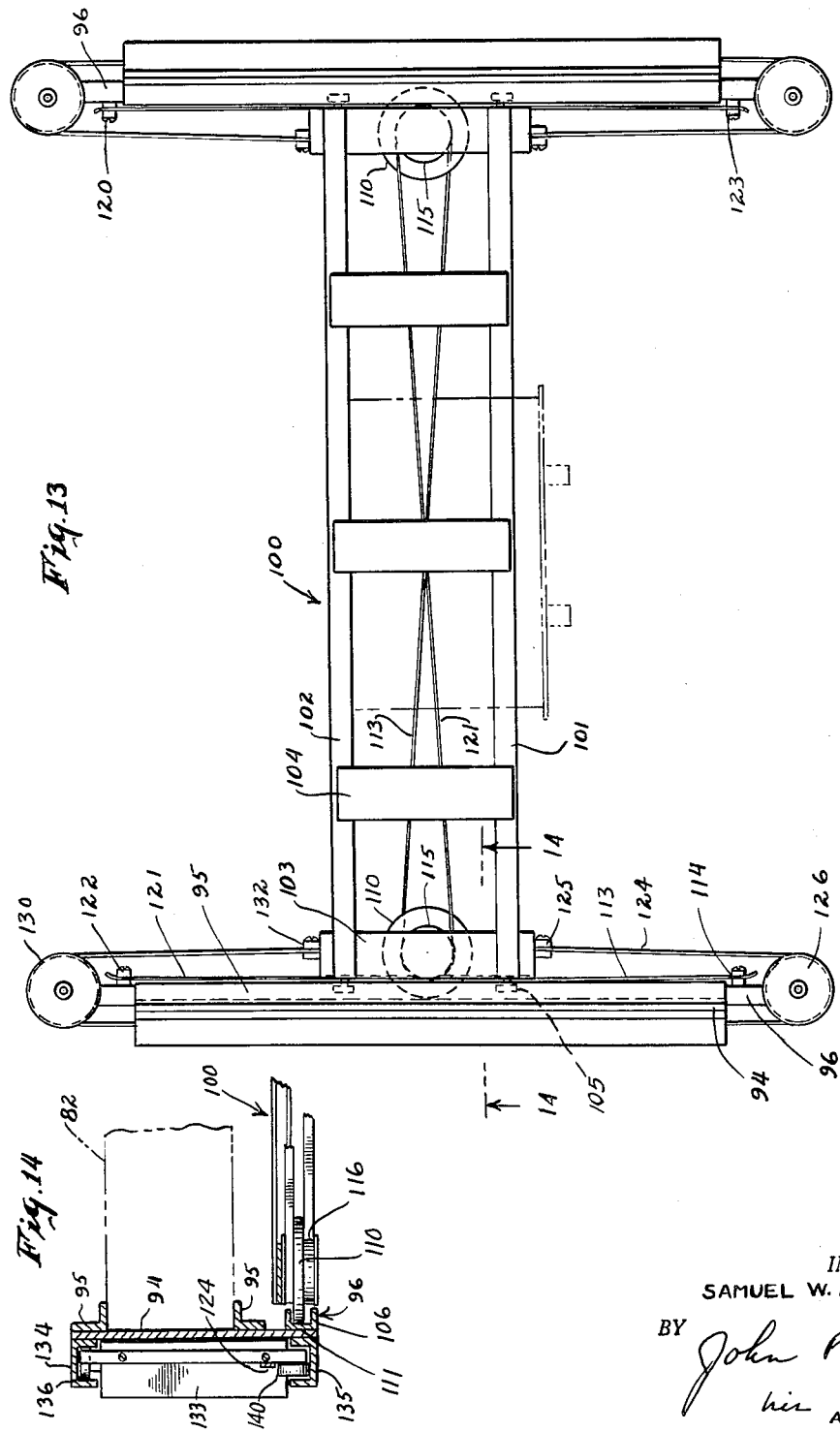

United States Patent Office 2,999,317
Patented Sept. 12, 1961

2,999,317
DRAFTING APPARATUS
Samuel W. Alderson, New York, N.Y., assignor to Alderson Research Laboratories, Inc., Long Island City, N.Y., a corporation of New York
Filed July 22, 1957, Ser. No. 673,191
17 Claims. (Cl. 33—26)

This invention relates to drafting machines and relates more particularly to a machine which will improve the quality and accuracy of drawings and reduce the time required for their preparation.

An important object of the invention is to provide a machine which will eliminate the use of a stylus (pencil or pen) which is held by hand against a straight-edge and a compass for manually drawing circles. Conventional drafting involves a system of straight-edges to define a coordinate system of horizontal and vertical lines over the drafting surface and to make lines at an angle to this coordinate system. The dimensional relationships of drawings are obtained by the use of scale rulers.

In the machine of the present invention the stylus is supported in a machine rather than in the draftman's hand and the degree of trueness of the line produced by the stylus is a function of machine accuracy rather than human skill and the drafting machine is set to a certain dimensional relationship by an expanded, direct-reading scale, and there is no secondary operation of relating the line to the plotted point, since the stylus takes precisely and automatically the position picked out on the scale. While producing a line with the machine, no care whatever is needed to maintain this position.

Another object of the invention is to provide means whereby the draftsman can pre-select a desired line weight and the machine will automatically and accurately produce the weight. A drawing of good appearance involves various line weights in its different parts. For example, a part outline must be a heavy line, but a dimensional or section line should be of medium weight. Both legibility and appearance are improved if all part outlines are of the same weight and if all dimensional lines are of a consistent and lighter weight. In conventional drafting, the draftsman must use great care to produce consistently uniform lines of several weights. In the drafting machine of the present invention, the draftsman can preselect a line weight and the machine will produce this weight automatically and accurately with great savings in time and improvement in uniformity.

A further object of the invention is to produce dot and dash lines of great speed and uniformity by the use of a fast-acting solenoid which makes each mark of uniform weight from end to end.

Yet another object of the invention is to provide a machine which has all of the operating parts except the stylus raised above the board, so the entire drawing can be seen at all times by the draftsman. All of the conventional drafting instruments are eliminated since these instruments are, in effect, located in the drafting machine under one hand of the draftsman. As a result the percentage of use time becomes far greater than in conventional drafting. Also a continuing supply of sharp lead is always available with no loss of time, and the triangles are not rubbing over the surface and smudging the lines.

Still another object is to provide means for eliminating the need for a draftsman continually moving his head and eyes along that side of the straight-edge being used for the line which causes a cramped position and resulting fatigue. The machine permits the draftsman to maintain a more comfortable and less fatiguing position.

The drafting machine of the present invention utilizes a system of pivots and slides whereby the stylus can produce lines in various directions along the drafting surface and with various relationships to each other. The principal frame of reference, or coordinate system, is called the primary coordinate system, and includes lines drawn both horizontally and vertically at any place on the drafting surface. This system comprises parallel rails at each end of the drafting board, a cross-beam which moves on these rails, maintaining a horizontal position, and a cross-slide which moves back and forth on the cross-beam.

When the cross-beam moves along the side rails, the stylus is carried in a vertical direction. When the cross-slide moves along the cross-beam, the stylus is carried in a horizontal position. This coordinate system corresponds to the lines produced by a T-square and the right angle side of a triangle.

Lines are produced at an angle to the main coordinate system by a secondary coordinate system. This is similar to the primary coordinate system and includes a vertical slide, attached pivotally to the cross-slide, a horizontal slide and a drafting head. When the horizontal slide moves along the vertical slide, the stylus is carried along in a direction parallel to the vertical slide. If the vertical slide is aligned with the side rails, the stylus will draw vertical lines. When the drafting head is moved along the horizontal slide it draws lines parallel to the horizontal slide and when the horizontal slide is lined up with the cross-beam, the stylus draws horizontal lines.

Normally the vertical and horizontal slides are lined up with the side rails and cross-beam so that the secondary coordinate system will produce lines that are shorter than, but parallel to, the main horizontal and vertical lines of the primary coordinate system. When the secondary coordinate system is rotated with respect to the primary coordinate system, it produces lines at any desired angle to those of the primary coordinate system. When the stylus is in its normal position, it is coaxial with the pivot, which is called the azimuth, and azimuthal rotation produces no stylus motion. If the stylus is not coaxial, an arc is produced by azimuthal rotation with a radius which is the hypotenuse of the offset of the stylus along the horizontal and vertical slides.

Finally, the drafting head includes a radius pivot and a radius arm. When the radius arm is moved it carries the stylus away from the radius pivot. When rotated about this pivot, the stylus then draws an arc or circle whose radius is equal to the distance by which the radius arm has displaced the stylus from a position coaxial with the radius pivot.

This system of motions produces all of the ordinary regular constructions of drafting. It is intended, however, that certain specialized constructions shall be made with the use of templates, or with the assistance of conventional drafting methods. Such special constructions, however, comprise only a small portion of drafting work.

In the drawings:

FIG. 2 is a side elevation showing the left-hand end of the structure shown in FIG. 1.

FIG. 3 is a broken rear elevation of the same end of the structure.

FIG. 4 is an end elevation of the main cross-beam and a phantom view of the side rail supporting the same for sliding movement.

FIG. 5 is a broken section taken on line 5—5 of FIG. 4.

FIG. 6 is a broken section taken on line 6—6 of FIG. 4.

FIG. 7 is a section taken through the cross-beam and showing the pivot for supporting the cross-slide, the section being taken substantially on line 7—7 of FIG. 1.

FIG. 8 is a front elevation, partially broken away, of the dial system for showing linear travel of the moving parts.

FIG. 9 is a broken plan view thereof.

FIG. 10 is a section taken on line 10—10 of FIG. 1.

FIG. 11 is a section taken on line 11—11 of FIG. 1.

FIG. 12 is a front elevation of the mark producing instrumentality or stylus.

FIG. 13 is a plan view of the secondary coordinate system, with its supporting cross beam removed.

FIG. 14 is a broken section taken on line 14—14 of FIG. 13.

Figure 1:
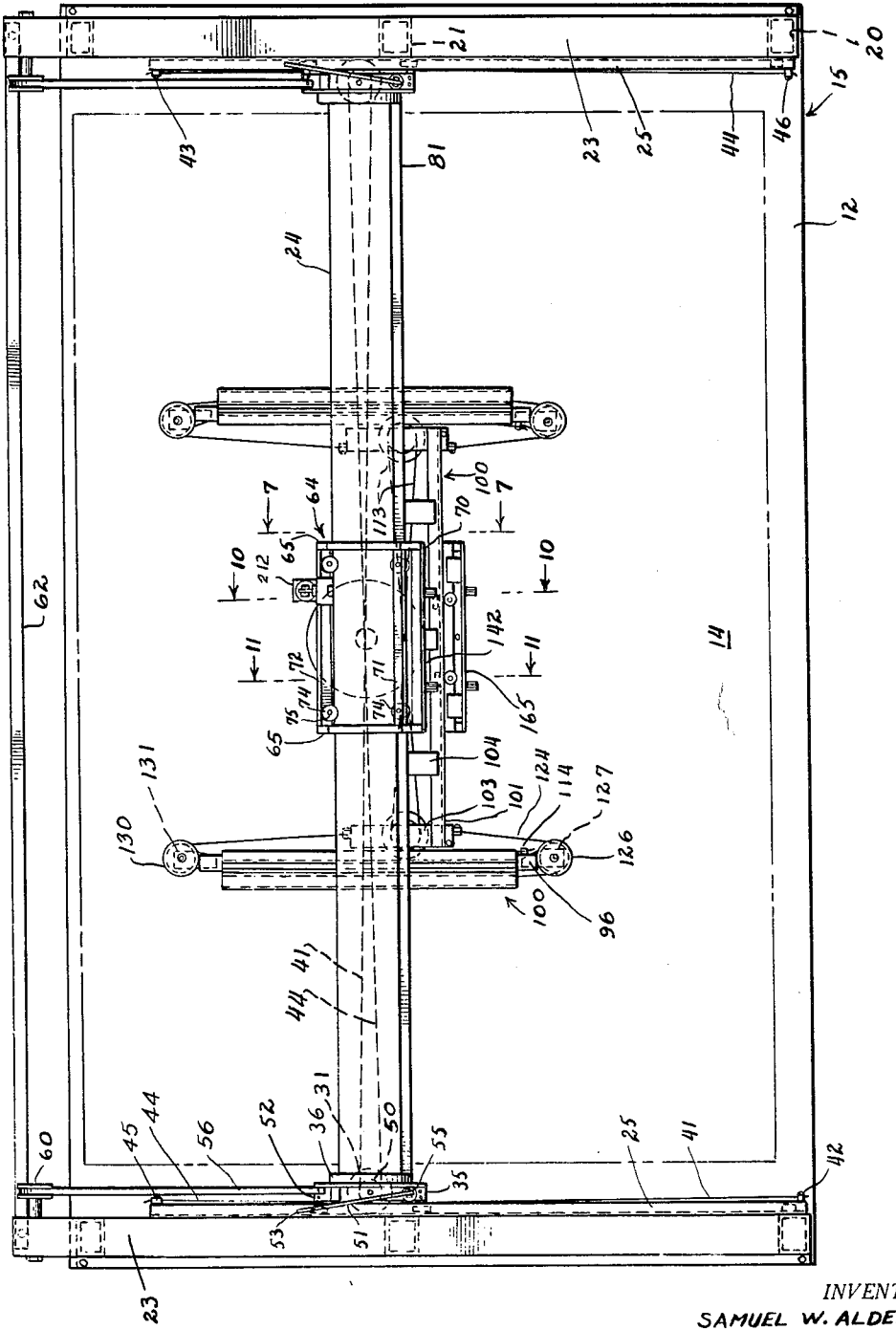
FIG. 1 is a plan view of a drafting table provided with the drafting apparatus of the present invention.

A drafting table is illustrated in FIGS. 1, 2 and 3 and it includes a horizontal table top 10 supported by legs 11. A drafting board 12 is mounted in inclined relation on the table top, the front edge of the board being supported by the table top and the rear edge being secured in said position by means of generally Z-shaped angle brackets 13. A sheet 14 of drawing paper overlays the drafting board.

A generally rectangular vertical end frame 15 is mounted on opposite sides of the board, each frame including a base plate 16 extending from the front to the rear edges of the board and is suitably secured thereto. The frame further includes vertical supports 20 at the ends of the base plate, an intermediate support 21 and a square tubular upper member 23. The primary coordinate system includes a tubular cross-beam 24 which is supported for free rolling movement from the front to the back of the drawing board in superimposed spaced relation thereto on channels or guide tracks 25 (FIGS. 4 and 5) secured to upper frame member 23. The alignment and parallelism of the guide tracks are set by adjusting screws (not shown) when installed on the board.

This rolling travel is accomplished by a pair of vertical rollers 26 at each end of the cross-beam which engage and closely fit the spaced upper and lower rails 30 of the channel (FIGS. 5 and 6) and by a horizontal roller 31 of larger diameter which engages the connecting wall 32 of the channel. Each roller 26 is mounted on a shaft 33 journalled in a bearing block 34 secured between upper and lower angle bars 35 mounted on a ring 36 secured as by screws at each end of the cross beam. Roller 31 is carried on a shaft 40 journalled in angles 35.

The cross-beam, which is movable rearwardly from the front edge of the drafting board, is retained at all times perpendicular to channels 25 (i.e., parallel to said front edge of the drafting board) by a system of tapes which pass from end to end through the hollow cross-beam. This system includes a tape 41 (FIG. 1) secured at 42 at the forward end of left channel 25 and at 43 at the rear end of right channel 25. The second tape 44 is secured at 45 at the rear of left channel 25 and at 46 at the forward end of right channel 25. The tapes pass around idler rollers or pulleys 50 (FIG. 5) positioned at each end of the cross-beam above and below large rollers 31 on shafts 40. By the use of ball bearings and precision alloy steel tapes the parts may have extremely accurate motion while retaining sensitivity to a light touch to urge them into motion.

The cross-beam is retained in a desired fixed position on channels 25 by means of a solenoid operated brake at each end of the beam and which consists of an elongated lever 51 (FIG. 1) pivoted on a block 52 adjacent the rear end 53 of said lever. The lower face of said rear end of the brake lever has a frictional engagement with the upper face of rail 30 of channel 25. The forward end of the brake is urged upwardly for braking action by a spring 54 (FIGS. 2 and 4) and an armature 49 extends downwardly from this forward end through a solenoid 55 which can overcome the force of the spring. When this solenoid is energized the brake is released.

Since the board 12 and the end frames 15 slope upwardly and rearwardly it is desirable to counterbalance the upward and rearward travel of the cross-beam and the elements supported thereby, and to this end tapes 56 (FIG. 3) are secured at their forward ends to blocks 52 (FIG. 1) and pass rearwardly over pulleys 60 carried on shafts 61 secured at the rear end of frame members 23. The rear ends of these tapes are secured to a crossbar 62 forming the counterweight which is guided for up and down travel on vertical rods 63 secured to the frames.

Cross-beam 24 supports a cross-slide 64 for longitudinal rolling movement thereon and which supports the secondary coordinate system. The cross-slide includes spaced end frames 65 having central openings 66 for the cross-beam. The frames are connected at the front by a plate 70 and by front and rear upper bars 71 and 72 and also by lower bars 73. Free rolling movement on the cross-beam is effected by a pair of spaced rollers 74 carried on shafts 75 on each of bars 71 and 72 and rollers 76 carried on shafts 77 secured between bars 73. The cross-slide is restrained against rotative movement on the cross-beam by rollers 80 freely journalled on the rear face of plate 7, which closely fits within a channel 81 fixed on the cross beam.

A square tubular cross-beam 82 (FIG. 7) which supports the secondary coordinate system is pivotally mounted on the lower side of cross-slide 64 by means of bearings 83 and 84 secured to beam 82 and which receive a shaft 85 secured to frame members 73—73 and which is referred to herein as the azimuth pivot.

Rotative movement of cross beam 82 on pivot 85 is restrained by means of an annular brake band 86 secured to an inner ring 90 which is substantially square in cross section, which latter is suitably secured on the upper wall of cross-beam 82. An internal brake 91, carried on lower bars 73 of cross-slide 64 is moved outwardly against brake band 86 by a spring 92 carried concentrically of a plunger 93, the plunger being urged inwardly to release the brake by means of a solenoid (not shown).

Vertical frames or plates 94 (FIGS. 7, 13 and 14) are secured at each end of beam 82, transversely thereof, by means of upper and lower angle bars 95 and an inwardly facing channel 96 is secured along the lower edge of each end plate 94. It will be noted from FIG. 13 that channels 96 extend beyond each end of plates 94. A frame 100 is mounted in end plates 94 for sliding movement parallel to the front of the board when the secondary coordinate system is parallel with the first. This sliding frame, which is referred to as the stylus frame since it supports the stylus assembly, comprises front and rear transverse frame members 101—102 maintained in spaced relation by end frames 103 and intermediate spacing bars 104. This frame is mounted for free travel in channels or guide tracks 96 by means of horizontally pivoted rollers 105 which engage the upper and lower walls 106 of said channel and by vertically pivoted rollers 110 which engage the connecting wall 111 of the channel.

Equal speed of travel of each end of frame 100 is effected by a system of tapes similar to that used in the primary coordinate system on cross-beam 24 and it includes a tape 113 secured at one end at the forward end of left channel 96. Roller 110 carries upper and lower pulleys 115—116 and tape 113 extends around lower pulley 116 and thence to the right across the full length of frame 100 where it passes around lower pulley 116 and thence rearwardly where it is secured at 120 at the rear end of right channel 96. Starting at the rear left, a second tape 121 is secured at 122, extends around left and right upper pulleys 115 and is secured at 123.

Since stylus frame 100 travels up an incline as it is moved rearwardly it is counterbalanced by a tape system at each end of the slide. This includes a tape 124 secured at 125 to the slide, the tape extending around a pulley 126 pivoted on a block 127 (FIG. 1) at the forward end of channel 96 and thence rearwardly and around a rear pulley 130 pivoted on a block 131 at the rear end of channel 96. It is secured at its opposite end at 132 on slide 100. The tape is secured to a counterweight 133 mounted for rolling movement in upper and lower channels 134—135 mounted on the outer face of end plate 94. A roller 136 pivoted on a vertical axis engages the opposed vertical rails of upper channel 134 and a roller 140 pivoted on a horizontal axis engages the lower wall of lower channel 135.

A 360 degree scale 139 is secured on the outer face of annular band 86 and by reference to a fixed pointer 141 (FIG. 7) the degree of rotation of the secondary coordinate on azimuth pivot 85 can be determined.

FIGS. 7, 8 and 9 show a typical dial for indicating continuously the position of the primary moving point from the drawing center or of the secondary moving point from the primary moving point. This arrangement includes a dial face 142 carried on cross-slide 64. Forward and rearward travel of cross-beam 24 toward the front and rear of the drafting board, respectively, is indicated on said dial face by means of a friction roller 143 (FIGS. 1, 5 and 8) which is fast on a shaft 144 having a spline 145, the friction roller engaging the lower face of rail 30 of guide track 25 and as the cross-beam 24 is moved forwardly or rearwardly the shaft rotates in one direction or the other.

Shaft 144 and shaft 146 at right angles thereto have suitable bearings (not shown) and motion is transmitted by bevel gears 147—148. Bevel gear 147 has a recess (not shown) which receives spline 145 for conjoint rotation with the shaft and a bearing support 139 causes gear 147 to travel with cross-slide 64.

The separation between graduations of a ruler, say 1/64 inch graduations, may be expanded by increasing the peripheral travel with respect to the roller. By using a step-down gear ratio, such as by employing a pinion 150 on shaft 146 which drives a gear 151 on shaft 152, a 4-to-1 ratio is obtained so that 1/64 inch may appear to be 1/8 inch, greatly adding to the accuracy of setting dimensions with the apparatus. This enlarged reading is obtained on dial 154. A step-up gear arrangement of the same type may be used to indicate a 4 to 1 step-up so that 10 inches may record 40 inches.

Longitudinal travel of cross-slide 64 is indicated by means of a friction roller 155 on shaft 156 which engages the lower face of channel 81 and this rotation is indicated by pointer 160. Pinion 161 on shaft 156 transmits reduced rotation to gear 162 on shaft 163 and total revolutions of pointer 160 are shown on dial 164. All dials are fixed to their shafts through friction discs (not shown) so that they may be re-set to zero for any choice of origins for either the primary or secondary coordinate system. Knobs 159 may be used for re-setting the dials. A second dial 165 (FIGS. 1, 10 and 11) carried by the secondary system may have the same arrangement including longitudinal splined shaft 166, pointer shaft 167 and bevel gears 168—169. Pinion 170 fast on shaft 167 drives gear 171. Also friction roller 172 is fast on shaft 173 carrying pinion 174 which drives gear 175.

The stylus 180 and its assembly including drafting head 181 are shown in FIGS. 10, 11 and 12 and this assembly is mounted for travel longitudinally of the secondary coordinate system or, more specifically, frame 100, by means of a stylus carriage 184 having rollers 182—183 in guide tracks 101—102. The stylus carriage includes a frame provided with an upstanding plate 185 and an angle bar 186 which supports rollers 182—183. A bearing 187 is secured to carriage 184 and receives a hollow shaft 190 at the lower end of which stylus assembly or drafting head 181 is secured. The drafting head has a rectangular bearing surface 194 for receiving a bar slide 195 having rack bar 196. The stylus 180 is mounted at one end of bar slide 195 and a pinion 197 carried on shaft 198 moves the stylus from a position where its pencil or other mark-producing instrumentality 199 is in vertical alignment with the axis of shaft 190 to a position eccentric of said axis, depending upon the length of bar slide 195 which determines the maximum diameter of circles which can be drawn. Shaft 198 and the pinion keyed thereto is manually turned by a knob 200 having graduations 201 showing the number of inches the stylus is displaced from the center and accordingly showing the radius of a circle being drawn. The stylus includes a cylinder 202 forming a support for a plunger 203 at the lower end of which the pencil, ball-pen or other marking device 199 is carried and a cartridge comprising the pencil is removable and can be quickly replaced when worn out. This plunger and the pen are normally held away from paper 14 by a spring 204 which engages a shoulder 205 fast on the plunger.

A sleeve 206 is slidably mounted on cylinder 202 and is connected with the upper end of a spring 207 which is relatively stronger than spring 204. When sleeve 206 is manually moved downwardly spring 207 overcomes the resistance of spring 204 and the pencil moves against the paper. The further down the sleeve is moved the greater the pressure and the heavier the line.

The sleeve may have a frictional resistance to downward travel on cylinder 202 so that when it is moved downwardly to an adjusted fixed position it remains in this position until it is changed. If desired one or more intermediate stops, 208—209, pivoted on cylinder 202 at 214 for sleeve 206 may be used to obtain a variation of line thickness. If stop 209 is in the upright position shown it limits downward travel of the sleeve and a light line is produced. If this stop is swung out of the way stop 208 is encountered and a heavier line is produced. If they are both swung out of the way the sleeve may descend still further.

A housing 210 secured to sleeve 206 has a plurality of switches 211 for operating the solenoid releasable locks, one of which 49, 51, 53 and 54, for the X axis on the primary coordinate system, has been described in detail. Another one for the Y axis is shown at 212 (FIG. 1) to lock the cross-slide 64 against movement. Similar locks (not shown) are provided on the secondary coordinate system and the lock 92—93 for radial axis linking the primary and secondary systems has been described. The switches are under the control of the operator at all times and wires 213 (FIG. 10) lead from the switches to the several solenoids. No circuit arrangement is shown for the reason that the circuits are simple, each one including a solenoid and a switch connected with the source of power.

As long as the secondary system is parallel with the primary system, and the stylus slide 195 is at zero, movement of stylus produces horizontal or vertical lines within the primary rectangular coordinate system. By moving bar slide 195 to a fixed position eccentric of axis 190 and rotating the drafting head a circle or an arc is produced. By rotating the secondary system to an adjusted fixed position movement of the stylus produces rectangles at an angle to the horizontal or vertical.

While there have described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. In a drafting machine, the combination of a drafting board provided with guide tracks at opposite ends thereof, and a primary and a secondary rectangular coordinate system, the primary system including a first cross-beam mounted for sliding travel in said tracks, a cross-slide mounted for sliding travel on the cross-beam, the secondary system including a second cross-beam centrally pivoted on the cross-slide, opposed end frames carried by said second cross-beam and provided with guide tracks, a stylus frame mounted for sliding travel in said last mentioned guide tracks at right angles to said second cross-beam, a stylus carriage mounted for longitudinal sliding travel on said stylus frame, a drafting head pivoted on said carriage, a bar slide mounted for movement on the drafting head and a stylus carried by said bar slide whereby movement of said cross-slide or said first cross-beam, when the coordinate systems are parallel, produces horizontal or vertical lines, respectively, and when non-parallel produces lines at an angle to said horizontal or vertical lines, and rotation of the drafting head, when the stylus is disposed eccentrically of the second pivot, produces circles.

2. An apparatus as defined in claim 1 wherein manually releasable locks are provided for restraining horizontal and vertical movement of the components of the primary and secondary systems and rotation of the latter on the former.

3. An apparatus as defined in claim 1 wherein solenoid releasable locks are provided for restraining movement of the primary and secondary systems and rotation of the latter on the former, and switches controlling energization of the solenoids are mounted on the drafting head.

4. An apparatus as defined in claim 1 wherein a system of tapes passing around pulleys and secured at each end thereof are employed for retaining the cross-slide and the stylus frame perpendicular to their guide tracks during travel.

5. An apparatus as defined in claim 1 wherein horizontal and vertical rollers are provided at the ends of the cross-slide and stylus frame for rolling movement in their guide tracks.

6. An apparatus as defined in claim 1 wherein the guide tracks for the cross-slide are inclined upwardly and rearwardly and weights connected with tapes counterbalance upward travel of the cross-slide and stylus frame.

7. An apparatus as defined in claim 1 wherein pointers mounted on dials record the distance of the cross-slide and the first cross-beam from a medial point on the drafting board.

8. An apparatus as defined in claim 1 wherein pointers responsive to movement of the parts of the two coordinate systems indicate distance of travel thereof from a medial point, and means are provided for enlarging the scale encompassed by said pointers.

9. An apparatus as defined in claim 1 wherein a dial indicates the angular relationship between the secondary and primary coordinate systems.

10. An apparatus as defined in claim 1 wherein the stylus is mounted for vertical sliding movement on the bar slide, and elastic means are provided for increasing or decreasing pressure of the stylus against the drafting board to vary the line thickness.

11. An apparatus as defined in claim 1 wherein the stylus is mounted for vertical sliding movement on the bar slide to an adjusted fixed position and a spring resists movement toward the drafting board and a stronger spring overcomes the resistance of the first spring in order to vary the line thickness.

12. An apparatus as defined in claim 1 wherein a spring is employed to hold the stylus above the drafting board to permit movement thereof to a desired position within the rectangular coordinate system without producing a line, and adjustable means are provided for moving the stylus against the drafting board to produce lines of varying thickness.

13. An apparatus as defined in claim 1 wherein means are provided for varying the line thickness produced by the stylus when moved within the two coordinate systems.

14. An apparatus as defined in claim 1 wherein means are provided for obtaining variable stylus pressure independent of variations of the draftsman's hand pressure.

15. An apparatus as defined in claim 1 wherein dial means continuously indicate the position of the stylus relative to a medial point on the board and the angular relation of the second system to the first.

16. An apparatus as defined in claim 1 wherein a rack is carried by the bar slide and a pinion journalled in the drafting head moves the bar slide in and out, and a knob carried by the pinion gives a direct reading of the distance of the stylus from the drafting head pivot.

17. In a drafting machine, the combination of a drafting board provided with channelled guide tracks at opposite ends thereof, and a primary and a secondary rectangular coordinate system, the primary system including a first cross-beam having rollers for travel in said tracks, a cross-slide mounted for sliding travel on the cross-beam, the secondary system including a second cross-beam centrally pivoted on the cross-slide, opposed end frames carried by said second cross-beam and provided with channelled guide tracks, a stylus frame provided with opposed rollers in said guide tracks for movement therein at right angles to said second cross-beam, means for retaining said second cross-beam and stylus frame perpendicular to the last mentioned tracks at all times, a stylus carriage mounted for longitudinal sliding movement on said stylus frame, a drafting head pivoted on said carriage, a slide mounted for movement on the drafting head and a stylus carried by said slide whereby movement of said cross-slide or said first cross-beam, when the two cross-beams are parallel, produces horizontal or vertical lines, respectively, and when non-parallel produces lines at an angle to said horizontal or vertical lines, and rotation of the drafting head, when the stylus is disposed eccentrically of the second pivot, produces circles.

References Cited in the file of this patent

UNITED STATES PATENTS

| | | |
|---|---|---|
| 842,662 | Heydrick | Jan. 29, 1907 |
| 1,149,120 | Fortune | Aug. 3, 1915 |
| 1,443,088 | Pasquariello | Jan. 23, 1923 |
| 2,219,783 | Matson | Oct. 29, 1940 |